(12) United States Patent
Algüera et al.

(10) Patent No.: US 8,186,717 B2
(45) Date of Patent: May 29, 2012

(54) WHEEL SEGMENT FOR A SUPPORTING LEG MADE OF CAST IRON

(75) Inventors: JoséManuel Algüera, Aschaffenburg (DE); Günter Seidel, Riedstadt (DE)

(73) Assignee: Jost-Werke GmbH, Neu-Isenburg (DE)

( * ) Notice: Subject to any disclaimer, the term of this patent is extended or adjusted under 35 U.S.C. 154(b) by 206 days.

(21) Appl. No.: 12/451,586

(22) PCT Filed: May 23, 2008

(86) PCT No.: PCT/EP2008/056371
§ 371 (c)(1),
(2), (4) Date: Nov. 20, 2009

(87) PCT Pub. No.: WO2008/142161
PCT Pub. Date: Nov. 27, 2008

(65) Prior Publication Data
US 2010/0072737 A1 Mar. 25, 2010

(30) Foreign Application Priority Data
May 23, 2007 (DE) .................. 10 2007 023 911

(51) Int. Cl.
*B60S 9/02* (2006.01)
(52) U.S. Cl. .................. 280/763.1; 248/188.8
(58) Field of Classification Search ............. 280/763.1, 280/764.1, 765.1, 766.1; 248/188.8, 188.9
See application file for complete search history.

(56) References Cited

U.S. PATENT DOCUMENTS

| | | | | |
|---|---|---|---|---|
| 3,889,972 A | * | 6/1975 | Bredt | 254/419 |
| 3,920,094 A | | 11/1975 | Claflin | |
| 5,137,301 A | * | 8/1992 | Muller et al. | 280/766.1 |
| 5,184,839 A | * | 2/1993 | Guedry | 280/475 |
| 6,802,535 B1 | * | 10/2004 | Alguera Gallego et al. | 280/763.1 |
| 7,395,993 B2 | * | 7/2008 | Riedl | 248/188.8 |

FOREIGN PATENT DOCUMENTS

| | | |
|---|---|---|
| DE | 3642079 A1 | 6/1988 |
| GB | 2207102 A | 1/1989 |
| GB | 2240527 A | 8/1991 |

\* cited by examiner

*Primary Examiner* — John Walters
(74) *Attorney, Agent, or Firm* — Hudak, Shunk & Farine Co. LPA

(57) ABSTRACT

A wheel segment for the pivotal mounting of a base plate to a support jack, wherein the wheel segment has a partially cylindrical jacket element having a winding surface that is curved on the underside of said jacket element, and two side walls positioned radially on the jacket element, wherein a stop point is configured in the upper section thereof. An arrangement of a wheel segment is further protected at a support jack. The aim of the invention, among others, is to produce a wheel segment in a cost-effective manner while maintaining equal stability. Said aim is attained according to the invention by a wheel segment that is produced as a one-piece casting.

20 Claims, 5 Drawing Sheets

A-A

B-B

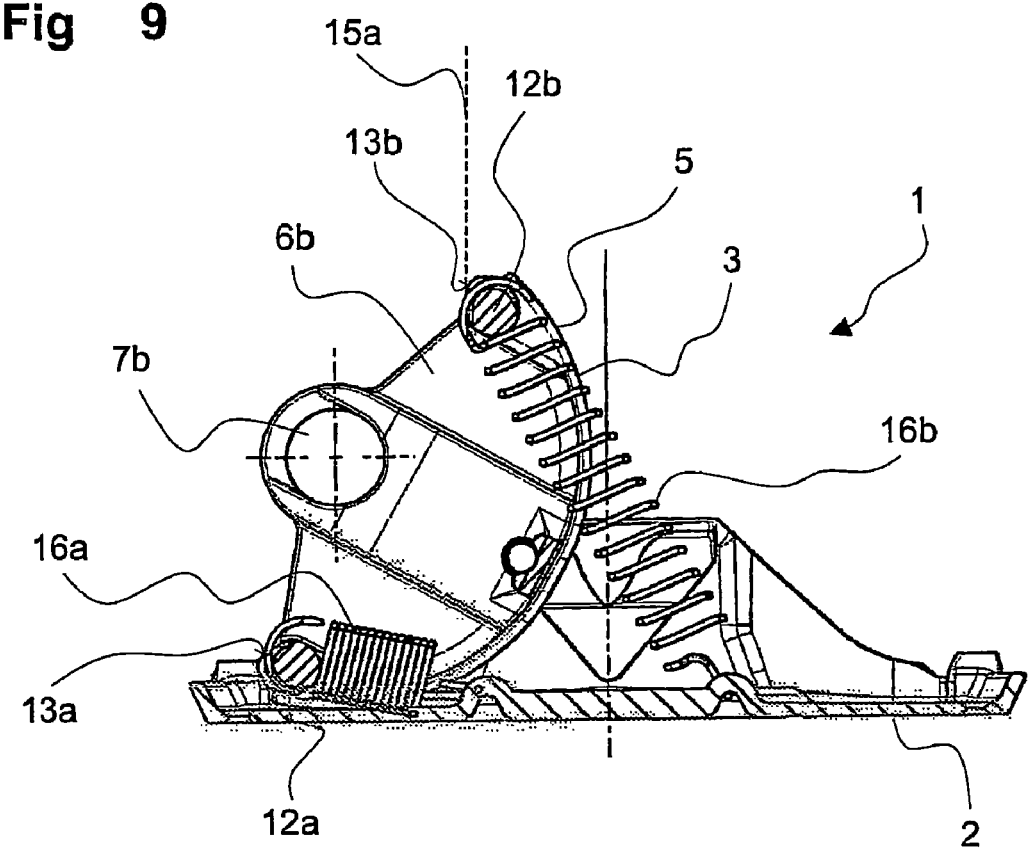

WHEEL SEGMENT FOR A SUPPORTING LEG MADE OF CAST IRON

FIELD OF THE INVENTION

The invention concerns a wheel segment for the pivoting mounting of a base plate on a support jack, wherein the wheel segment has a partly cylindrical shell element with a curved rolling surface on its bottom side and two side walls positioned radially on the shell element, with a stopping point configured in the upper section of each of them. An arrangement of the wheel segment on a support jack is likewise specified.

BACKGROUND OF THE INVENTION

Such support jacks are usually found in paired arrangement on the bottom of semitrailers. Usually they comprise an outer tube which can be mounted stationary on the trailer and a second inner tube, telescoping in the former tube, and having a base plate located at its end. To uncouple the trailer, the support jacks are extended, so that they support the trailer in its front region and allow the tractor to drive off from underneath the trailer. In presently used pneumatic cushioned trailers, a sinking of the back region of the trailer can occur during lengthy standstill, caused by a loss of pressure in the pneumatic bellows of the trailer. Due to the sinking of the trailer, shear forces also act in the longitudinal axis of the support jacks, resting on the ground with their support surfaces frictionally engaged, and therefore exposed to a substantial bending and buckling stress.

To counteract this effect, efforts had already been undertaken in the past to arrange a wheel segment at the lower region of the support jack, which equalizes the shear forces occurring by a rolling against the base plate located underneath.

A known wheel segment is described in DE 40 03 414 A1, consisting of several individual components that are welded together. Such a fabrication is extremely costly, since the side walls have to first be oriented exactly relative to each other before being welded to the rolling surface. Then additional reinforcing plates are welded individually by hand to the side walls and the cross arms running between them.

SUMMARY OF THE INVENTION

Consequently, the problem on which the invention is based was to make a wheel segment more cheaply, with at least the same strength.

The problem is solved according to the invention with a wheel segment that is fabricated as a single-piece cast iron part. By single piece is meant all undetachable structural elements of the wheel segment are in the ready to install condition. This includes, in particular, reinforcing plates and cross arms joining the side walls.

It has been found to be favorable to have an opening in the shell element on either side of the bottom vertex point. By vertex point is meant, in the case of a vertically upright support jack, the segment of the rolling surface of the wheel segment located directly underneath, lying at the center between the two ends of the rolling surface in the circumferential direction. Spring elements in the form of helical springs, for example, can be led through these openings, which ensures a return movement of the base plate in the unloaded condition.

The respective openings are advantageously configured not as a slot with a rectangular contour, but instead have at least one widening in the circumferential direction of the shell element, at a distance outwardly from the vertex point. The widening can be shaped as a parabola or half-round, as compared to the original slot contour.

Thanks to the contour of the opening being at least partly widened toward the outside, a shell element with relatively much material in the region of the vertex point remains with a large surface to absorb vertically acting peak loads. On either side of the vertex point of the wheel segment, on the other hand, a large rolling surface is not needed, since the loads expected there are smaller. Hence, a rolling surface reduced by the widening with increasing distance from the vertex point in the circumferential direction is sufficient. The widening again diminishes toward the outer edge of the rolling surface and the rolling surface becomes larger in equal measure. On the whole, this preferred embodiment offsets the disadvantage of the intrinsically heavier fabrication of the wheel segment as a cast iron part by material savings in the less heavily loaded surfaces.

The side walls should be joined together by cross arms at either end in the circumferential direction. In the first place, these cross arms serve as an end stop when the base plate is fully deflected. In addition, spring elements can be suspended from the cross arms, exerting a restoring force on the base plate in the direction of a central position underneath the vertex point of the wheel segment.

Preferably, the shell element has a flattening at its bottom vertex point.

Thanks to the flattening or level surface in the region of the vertex point, when the support jack is in the deployed condition and peak loads are acting in the vertical direction on the wheel segment or the base plate situated underneath, there is a larger surface available to absorb the impacts and deflect the forces than would be the case with a partly cylindrical rolling surface. The latter only enables a line-type contact between the wheel segment and the base plate with correspondingly high surface pressures. And these are especially disadvantageous in the case of cast iron material with its tendency to brittle fracture.

According to an especially advisable embodiment, each cross arm has an inwardly slanted end stop surface. The end stop surfaces are oriented so that they lie in two dimensions against the tube of the support jack when making contact with it. The line-type contact between a cross arm of round cross section (for example) and the tube of the support jack which usually occurs with the known wheel segments is avoided in this way. This, in turn, substantially reduces the notch effect on the structural parts in question. A slanted end stop surface is particularly easy to accomplish on a cast iron part.

The wheel segment can be cast without a core, which is favorable to the fabrication technology.

The above specified wheel segment is usually integrated in a support jack in the installed condition and forms, together with the base plate, a support base, wherein the support jack has a lower tube segment on which the wheel segment is pivoted, and the wheel segment is able to roll against the base plate.

Preferably, the flattening in a starting position makes two dimensional contact with the base plate. By starting position is meant a central position of the support base and thus the base plate in the unloaded condition of the support jack.

Likewise, when the wheel segment is at maximum deflection, the respective end stop surface of the cross arm lies in two dimensions against the lower tube segment of the support jack, so that the surface pressure acting on the structural parts is substantially diminished.

Advantageously, a spring element is arranged between each cross arm and the support base. The spring element is preferably suspended by its first end from the cross arm and by its opposite second end from the base plate. This lower stopping point of the spring element on the base plate should be provided at either end of the vertex point of the wheel segment. If the cross arms are displaced outwardly relative to the lower stopping points, the spring elements will have a V-shaped orientation to each other.

BRIEF DESCRIPTION OF THE DRAWINGS

For better understanding, the invention will be explained more closely below by means of a total of nine figures. There are shown:

FIG. 9: a cross section through the support base of FIG. 8 in a maximum deflected position.

DETAILED DESCRIPTION OF THE INVENTION

Figure 1:
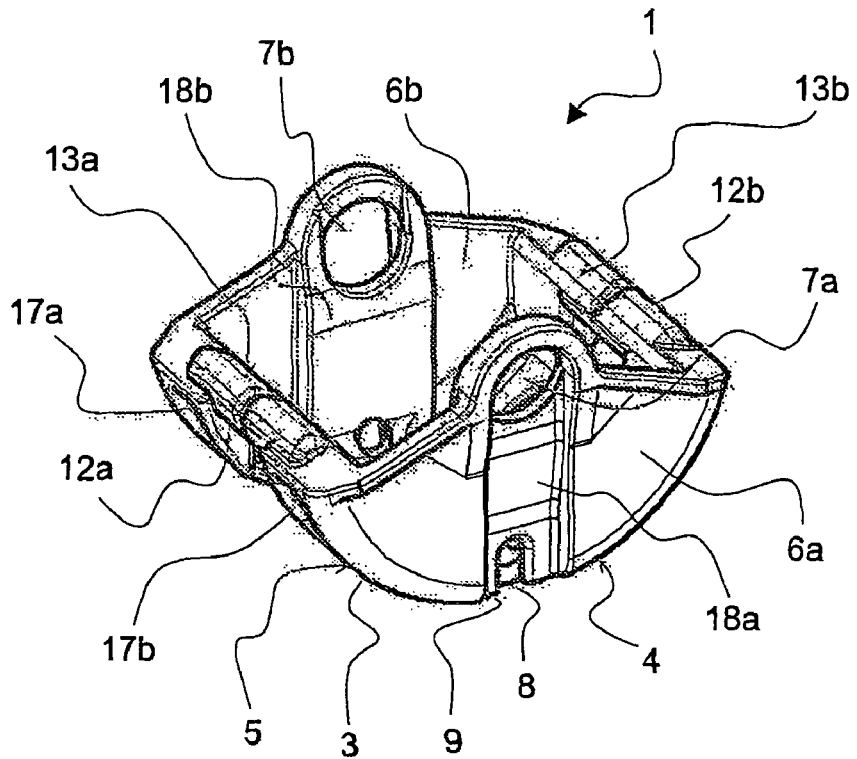
FIG. 1: a perspective view of a wheel segment according to the invention.
Figure 7:
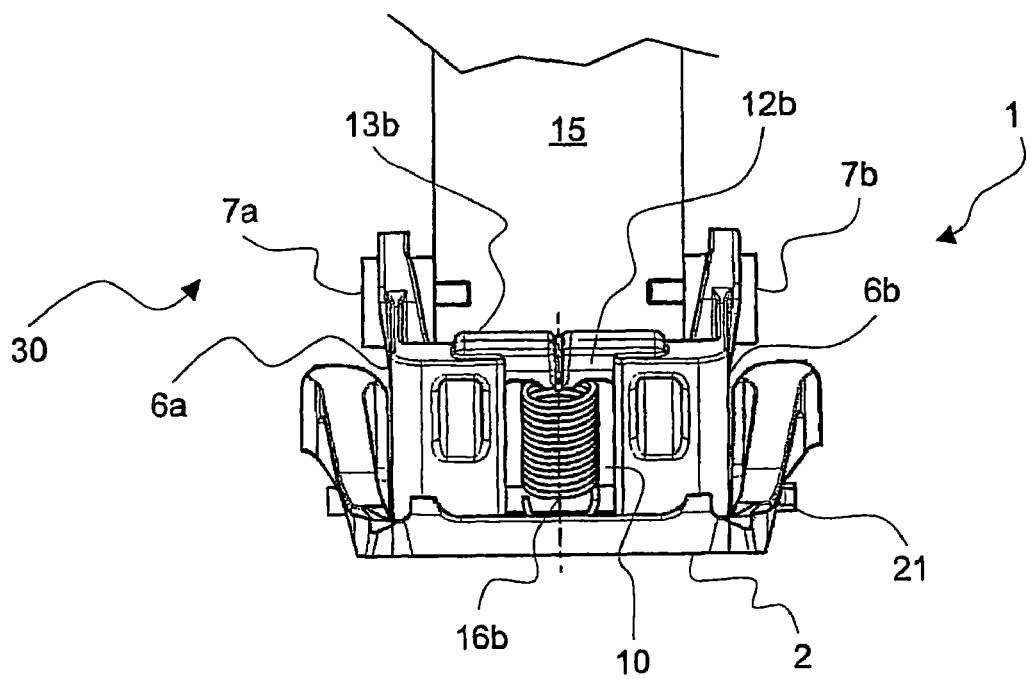
FIG. 7: a head-on view of a support base with wheel segment and base plate, mounted on a lower tube segment.

FIG. 1 shows a perspective view of a wheel segment 1, which is mounted on a lower tube segment 15 of a support jack 30 (see FIG. 7).

Figure 2:
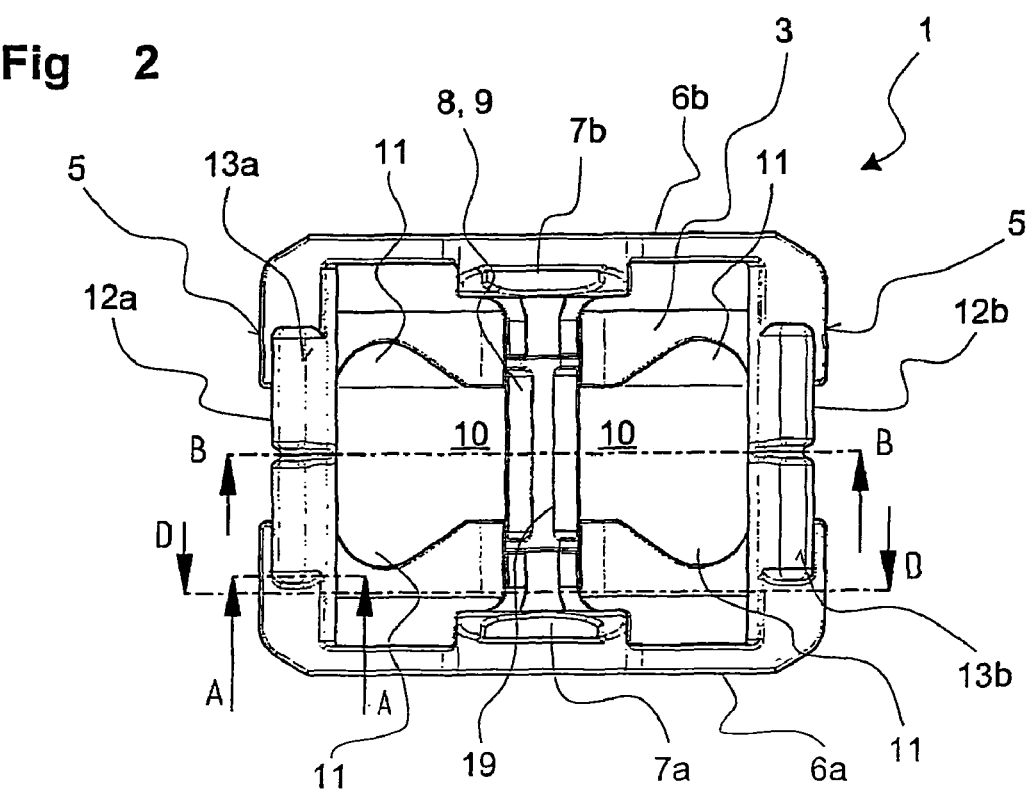
FIG. 2: a top view of the wheel segment of FIG. 1.

The wheel segment 1 has two parallel side walls 6a, 6b, which are joined together at their bottom end 4 by a partly cylindrical shell element 3, which has two convex curved rolling surfaces 5, and by cross arms 12a, 12b and a middle web 19 (see FIG. 2). At the upper end, the side walls 6a, 6b are each provided with a stopping point 7a, 7b, the two stopping points 7a, 7b being aligned in a swivel axis. The swiveling mounting of the wheel segment 1 on the lower tube segment 15 (see FIG. 7) can be done, for example, by means of a continuous bolt or two individual bolts, not further depicted, which stand out to the side relative to the tube segment 15 or a bearing element installed therein and are actively engaged with the stopping points 7a, 7b.

The shell element 3 extends in the circumferential direction in approximately semicircular shape as far as a horizontal plane beneath the stopping points 7a, 7b. At the end of the shell element 3 on both sides are the cross arms 12a, 12b, running across the entire width. Each cross arm 12a, 12b has a material thickening with a flat end stop surface 13a, 13b. The end stop surface 13a, 13b upon making contact with the lower tube segment 15 (see FIG. 7) abuts against it in two dimensions and thereby lessens the risk of damage both on the part of the wheel segment 1 and on the part of the lower tube segment 15. When the wheel segment 1 is standing perfectly upright, the end stop surfaces 13a, 13b are sloping inward at an angle of around 45 degrees. The vertex point 8 of the shell element 3 is located in the middle between the cross arms 12a, 12b, precisely underneath the stopping points 7a, 7b in the circumferential direction.

The side walls 6a, 6b have a wall segment 18a, 18b that is set back underneath the stopping points 7a, 7b, merging directly into the shell element 3 in the region of the bottom end 4. The set-back wall segment 18a, 18b serves, first, for the fabrication with no core. Furthermore, the stability is enhanced thanks to the increased cross section of the wall segments 18a, 18b in the direction of the stopping points 7a, 7b.

FIG. 2 shows the wheel segment 1 in a top view, in which the basic rectangular shape can be recognized in the region of the equidistant side walls 6a, 6b and the two cross arms 12a, 12b.

Between the two side walls 6a, 6b, one notices openings 10 formed in the shell element 3 on either side of the sectioning line B-B. The openings 10, first, make possible a chordlike passing of a spring element 16a, 16b through the shell element 3 according to FIGS. 8 and 9. Especially when the wheel segment 1 is tilted, one of the spring elements 16b runs for a considerable portion inside the shell element 3. Each opening 10 is bounded in the circumferential direction by a middle web 19, joining the side walls 6a, 6b in the axial direction, beneath the stopping points 7a, 7b, in the region of the vertex point 8, and by the cross arms 12a, 12b. The openings 10 have an essentially rectangular contour, whose width corresponds at least to the diameter of the spring elements 16a, 16b (see FIGS. 8 and 9).

The opening 10 is formed with a semicircular widening at opposite ends in the circumferential direction between the middle web 19 and the particular cross arm 12a, 12b. The representation of FIG. 2 in top view does not reveal the segments of the opening 10 lying outside of the widening 11 in the circumferential direction; however, these can be seen in the cross section of FIG. 5. The widenings 11 lie in less heavily loaded regions of the rolling surface 5 and serve to reduce the weight of the cast iron design, which would otherwise be heavier than welded wheel segments 1.

Figure 3:
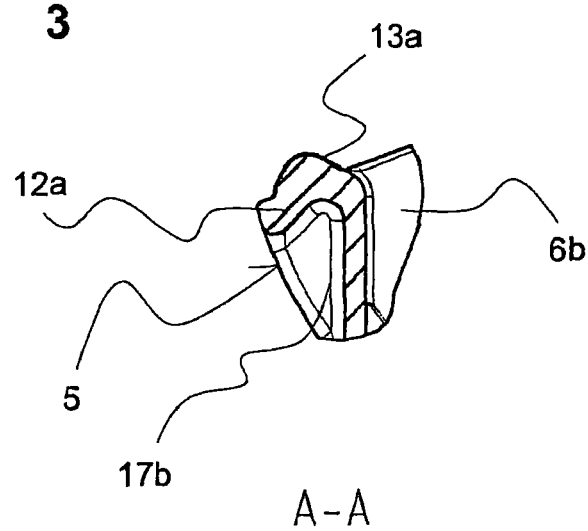
FIG. 3: a section through the wheel segment along plane A-A in FIG. 2.

FIG. 3 shows a magnified cutout of the wheel segment 1 in the region of the cross arm 12a. The end stop surface 13a project upward from the cross arm 12a as a material thickening, due to the cast design. Beneath the cross arm 12a is a pocket 17b between the side wall 6a and the opening 10 in the rolling surface 5, and behind this another pocket 17a, being designed to avoid a buildup of material with the risk of forming shrinkage cavities. Moreover, the mass of the wheel segment 1 will be decreased by the pockets 17a-d.

Figure 4:
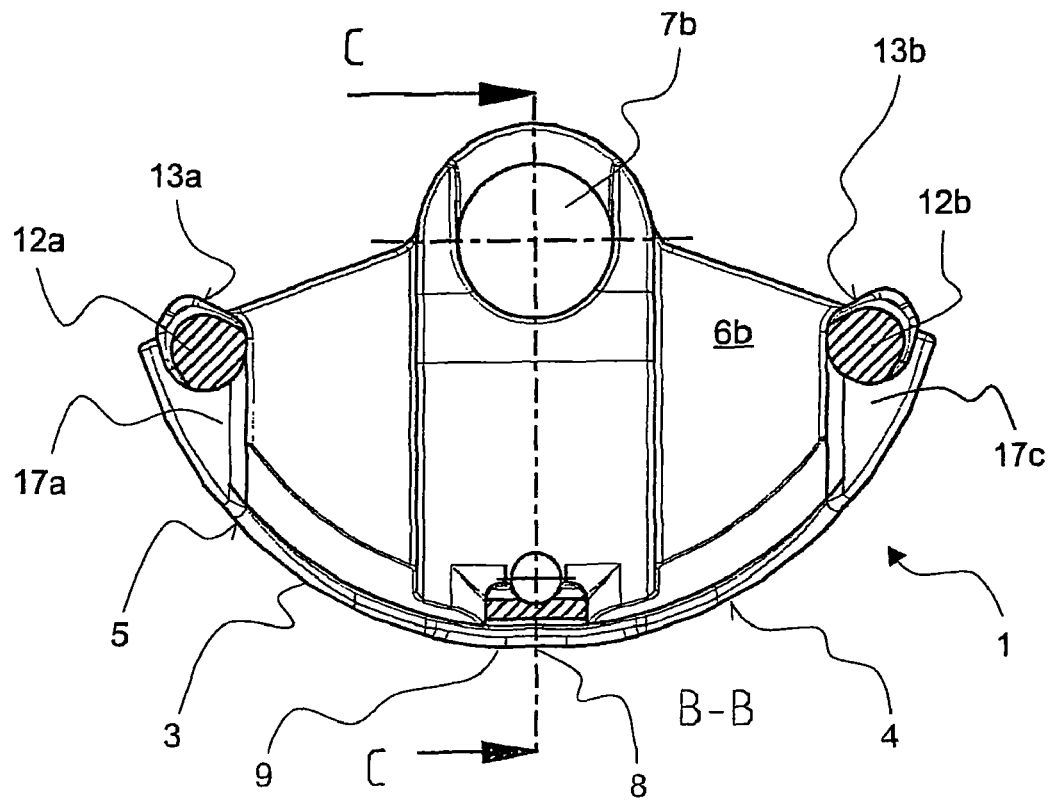
FIG. 4: a section through plane B-B along the wheel segment in FIG. 2.

FIG. 4 shows a longitudinal section through the wheel segment 1 corresponding to line B-B in FIG. 2. In the region of the vertex point 8, the rolling surface 5 has a flattening 9. When the support jack 30 is placed on the ground, this region is in contact with the support base 14 located underneath (see FIG. 8) and usually absorbs the greatest anticipated forces. For this reason, the formation of the flattening 9 also provides a correspondingly large surface for diverting the forces into the wheel segment 1. The flattening 9 has at least the length of the middle web 19. It is especially easy to make the flattening, due to the wheel segment 1 being produced as a cast iron part.

Figure 5:
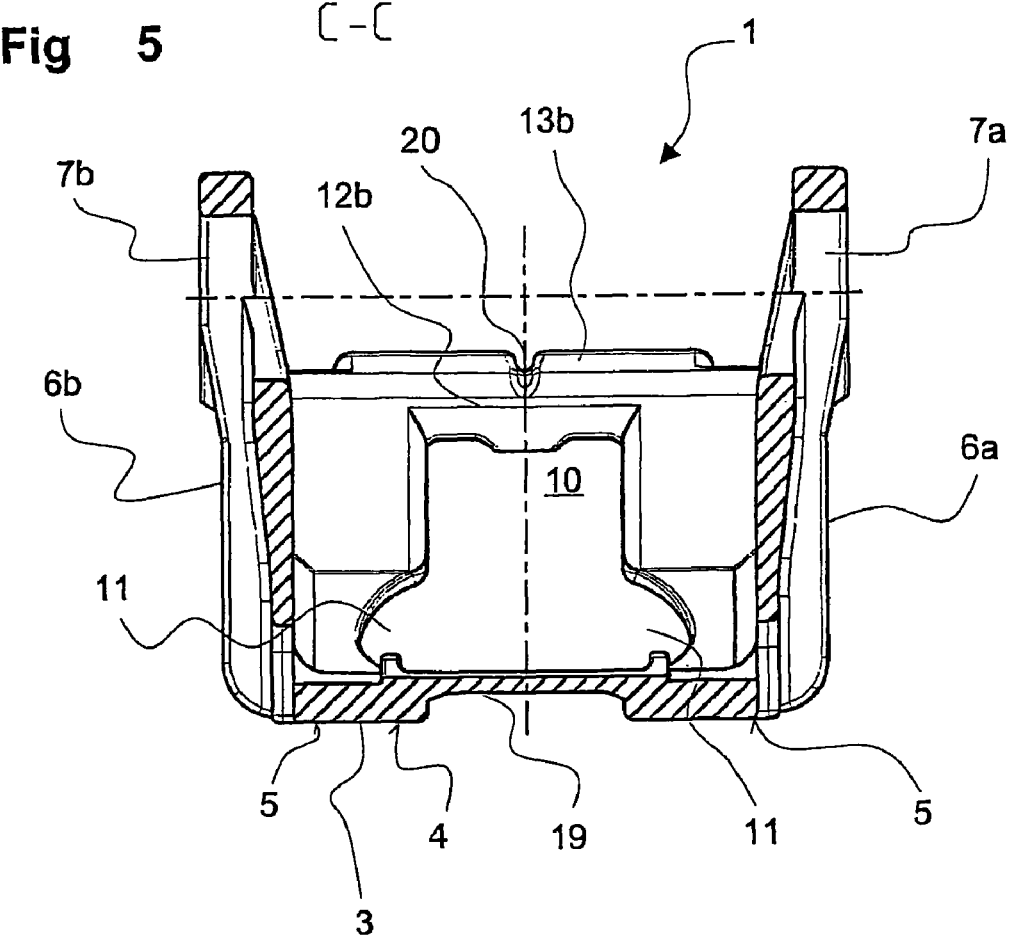
FIG. 5: a section through the wheel segment along plane C-C in FIG. 4.

FIG. 5 shows especially well the course of the opening 10 inside the rolling surface 5, running from the middle web 19 to the cross arm 12b. Above the widenings 11, the opening 10 continues in uniform width, corresponding to its course beneath the widenings 11. In this way, the loss in standing surface due to the pockets 17a-d is compensated.

The cross arm 12b, like the identically shaped cross arm 12a, each have a notch 20 within the lengthwise axis in the region of the end stop surface 13a, 13b. The notch 20 simplifies the suspending of a spring element 16a, 16b directly from the cross arm 12a, 12b of the wheel segment 1 (see FIG. 8, 9).

Figure 6:
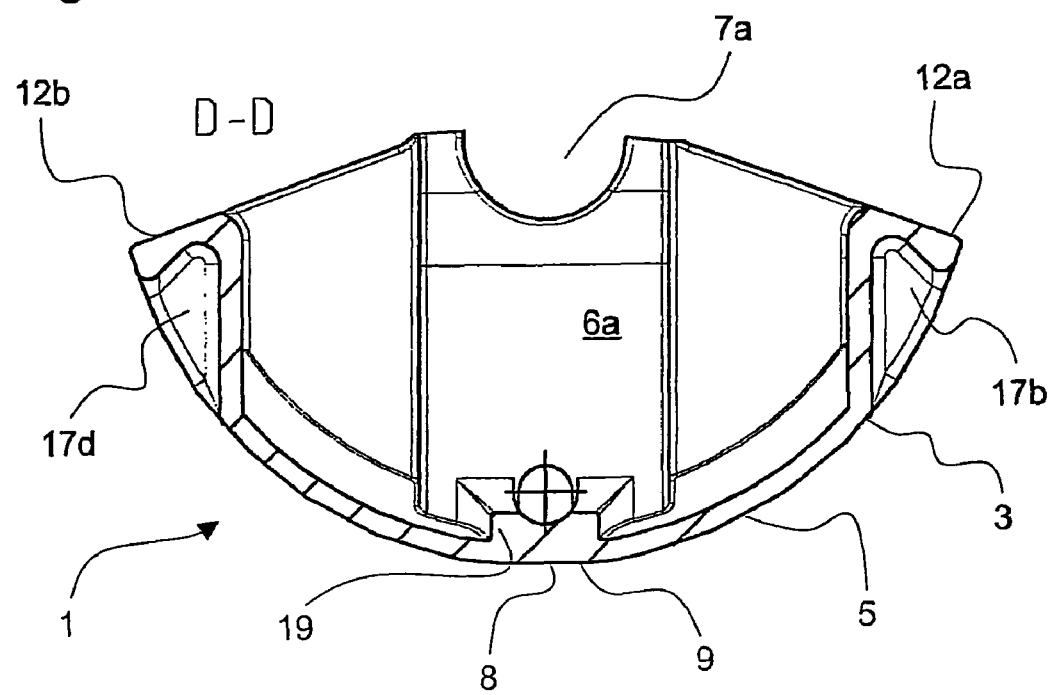
FIG. 6: a section through the wheel segment along plane D-D in FIG. 2.

FIG. 6 shows a section along line D-D in FIG. 2. The cross arms 12a, 12b have no end stop surfaces 13a, 13b in this side region, since they lie outside the action zone of the lower tube segment 15. Beneath the cross arms 12a, 12b, one notices the pockets 17b, 17d. The pockets 17a, 17b, 17c, 17d are formed by a partial vertical wall of the rolling surface 5, which passes into the respective cross arms 12a, 12b at its upper segment.

The middle web 19 rises above the top of the rolling surface 5 as a thickening and thereby increases the strength of the wheel segment 1 in the region of the flattening 9.

FIG. 7 shows in front view the lower end of an otherwise not further depicted support jack 30, or its lower tube segment 15 with a support base 14 mounted thereon. The support base 15 comprises the wheel segment 1 and the base plate 2 engaging with it. The wheel segment 1 is pivoted to the lower tube segment 15 in familiar manner by its stopping points 7a, 7b. The base plate 2, in turn, is arranged removably or nonremovably on the wheel segment 1 by means of the rod 21, while the rod 21 passes through the wheel segment 1 above the middle web 19 (see FIG. 6). Inside the opening 10 is the spring element 16b, which is secured by its top end to the cross arm 12b and by its opposite bottom end to the base plate 2. A second spring element 16a is arranged in identical manner on the back side, not visible in the view shown.

Figure 8:
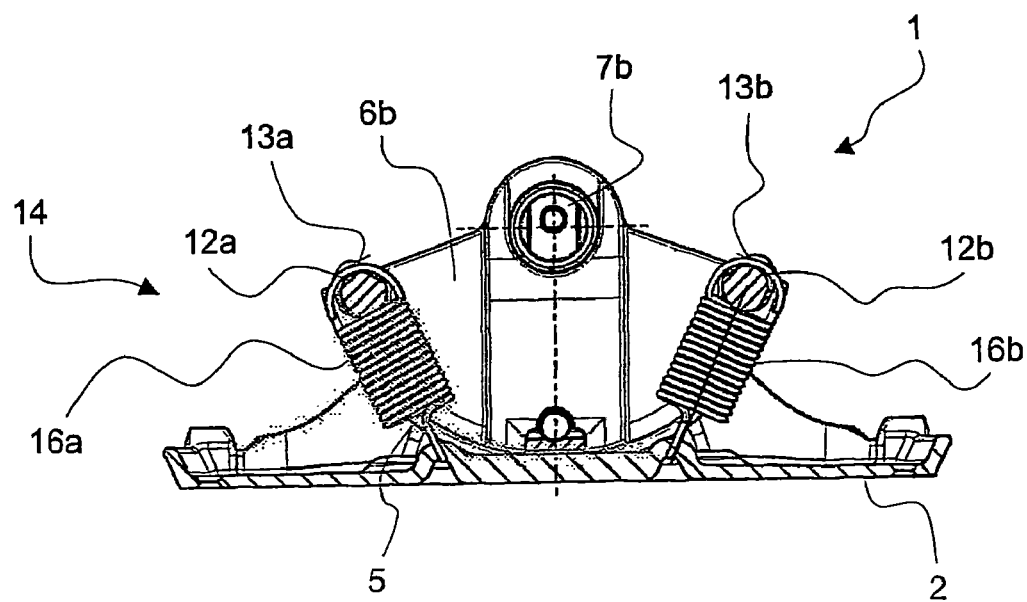
FIG. 8: a cross section through a support base with wheel segment and base plate in a starting position.

The two spring elements 16a, 16b hold the unloaded support base 14 in a neutral position per FIG. 8, in which the wheel segment 1 is oriented centered above the base plate 2. In this position, the two spring elements 16a, 16b are under a certain pretension.

FIG. 9 shows the support base 14 after a lateral shift, the wheel segment 1 having rolled to one side on the base plate 2 by its rolling surfaces 5. The rolling process is limited by the end stop surface 13b of the cross arm 12b abutting against the schematically indicated wall 15a of the lower tube segment 15. The spring element 16a is in a compressed state and the spring element 16b in a maximum stretched state.

LIST OF REFERENCE ELEMENTS 1 wheel segment
2 base plate
3 partly cylindrical shell element
4 bottom end
5 rolling surface
6a, b side wall
7a, b stopping point
8 vertex point of rolling surface
9 flattening
10 opening
11 widening
12a, b cross arm
13a, b end stop surface
14 support base
15 lower tube segment of support jack
15a wall of lower tube segment
16a, b spring element
17a-d pocket
18a, b set-back wall segment
19 middle web
20 notch
21 rod
30 support jack

What is claimed is:

1. Wheel segment for the pivoting mounting of a base plate on a support jack, wherein the wheel segment comprises: a partly cylindrical shell element with a curved rolling surface on a bottom side and two side walls positioned radially on the shell element, with a stopping point configured in an upper section of each of the side walls, wherein the wheel segment is fabricated as a single-piece cast iron part, wherein an opening is formed in the shell element on either side of a bottom vertex point, and
wherein the opening has at least one widening at a distance outwardly from the vertex point in a circumferential direction of the shell element.

2. The wheel segment according to claim 1, wherein ends of the side walls are joined together by cross arms in a circumferential direction.

3. The wheel segment according to claim 2, wherein each cross arm has an inwardly slanted end stop surface.

4. The wheel segment according to claim 1, wherein the shell element has a flattening at a bottom vertex point of the shell element.

5. The wheel segment according to claim 1, wherein the wheel segment is cast without a core.

6. Arrangement of a support base, comprising a wheel segment according to claim 1 and the base plate secured to the wheel segment, on the support jack, wherein the support jack has a lower tube segment on which the wheel segment is pivoted, and the wheel segment is able to roll against the base plate.

7. The arrangement according to claim 6, wherein a flattening in a starting position makes two dimensional contact with the base plate.

8. The arrangement according to claim 7, wherein when the wheel segment is at maximum deflection, a respective end stop surface lies in two dimensions against the lower tube segment.

9. The arrangement according to claim 7, wherein a spring element is arranged between each cross arm and the support base.

10. The arrangement according to claim 6, wherein when the wheel segment is at maximum deflection, a respective end stop surface lies in two dimensions against the lower tube segment.

11. The arrangement according to claim 10, wherein a spring element is arranged between each cross arm and the support base.

12. The arrangement according to claim 6, wherein a spring element is arranged between each cross arm and the support base.

13. Wheel segment for the pivoting mounting of a base plate on a support jack, wherein the wheel segment comprises: a partly cylindrical shell element with a curved rolling surface on a bottom side and two side walls positioned radially on the shell element, with a stopping point configured in an upper section of each of the side walls, wherein the wheel segment is fabricated as a single-piece cast iron part, and wherein the shell element has a flattening at a bottom vertex point of the shell element.

14. The wheel segment according to claim 13, wherein an opening is formed in the shell element on either side of a bottom vertex point.

15. The wheel segment according to claim 14, wherein the opening has at least one widening at a distance outwardly from the vertex point in a circumferential direction of the shell element.

16. The wheel segment according to claim 14, wherein ends of the side walls are joined together by cross arms in a circumferential direction.

17. The wheel segment according to claim 16, wherein the opening has at least one widening at a distance outwardly from the vertex point in the circumferential direction of the shell element.

18. Arrangement of a support base, comprising a wheel segment comprising a partly cylindrical shell element with a curved rolling surface on a bottom side and two side walls positioned radially on the shell element, with a stopping point configured in an upper section of each of the side, walls, wherein the wheel segment is fabricated as a single-piece cast iron part, a base plate secured to the wheel segment, on a support jack, wherein the support jack has a lower tube segment on which the wheel segment is pivoted, and the wheel segment is able to roll against the base plate, and wherein a flattening in a starting position makes two dimensional contact with the base plate.

19. The arrangement according to claim 18, wherein when the wheel segment is at maximum deflection, a respective end stop surface lies in two dimensions against the lower tube segment, and wherein a spring element is arranged between each cross arm and the support base.

20. The arrangement according to claim 18, wherein a spring element arranged between each cross arm and the support base.

* * * * *